United States Patent Office 3,803,330
Patented Apr. 9, 1974

3,803,330
MEAT FLAVOR COMPOSITION AND PROCESSES
Jacob R. Feldman, New City, and Jeffrey H. Berg, Riverdale, N.Y., assignors to General Foods Corporation, White Plains, N.Y.
No Drawing. Filed Mar. 30, 1972, Ser. No. 239,790
Int. Cl. A23l 1/26
U.S. Cl. 426—65
2 Claims

ABSTRACT OF THE DISCLOSURE

A composition containing 2-pyridine methanethiol for providing or improving a meaty flavor.

BACKGROUND OF THE INVENTION

The present invention relates to a synthetic meat flavor. More specifically, it relates to the use of 2-pyridine methanethiol as a pork-like flavor in meat analog systems, meat and meat by-product systems and the like.

The synthesis of the flavor and aroma of meats has been the subject of a long and continuing search by food technologists and fragrance chemists, particularly in the area of meat analogs. Due to the severe shortage of high protein foods in many parts of the world, such analogs are being produced which are high in protein and as palatable and meat-like in flavor as possible. Hence, a need for compounds which assume or exactly reproduce the flavor and aroma of meats is evident.

In addition, there are many products on the market which have as their main ingredient, meat and/or meat byproducts. Due to the method of processing and/or preservation, much of the meaty flavor and aroma is lost, example being meat sandwich spreads, concentrated soups, packaged gravies, dog food and the like. A meat flavor additive which serves to produce or improve a meaty flavor and which is at the same time stable under typical processing, preserving and storage conditions, would be useful.

2-pyridine methanethiol is an old compound. It has been used as an intermediate in the preparation of disulfide compounds useful as beverage enhancers e.g. bis-(2-pyridyl methyl) disulfide as evidenced in U.S. Pat. No. 2,951,848 issued Sept. 6, 1969. It is described as a GRAS substance in the May 1970 issue of "Food Technology" vol. 24, 533 p. 34. However, its use as a meat flavor is not disclosed in prior art.

SUMMARY

It has been found that 2-pyridine methanethiol exhibits a strong odor and flavor of roasted pork. More particularly, 2-pyridine methanethiol may be added to a foodstuff in an amount effective to impart a meat-like flavor to the foodstuff. In the previously cited GRAS reference, many of the compounds mentioned are used in meats, meat sauces and the like, and yet the "meaty" notes of 2-pyridine methanethiol have not been recognized. Apparently the concentration of purity of 2-pyridine methanethiol previously used in ices, ice cream, candy, gelatin, puddings and beverages has made the pork-like flavor not immediately apparent.

The advantages of using 2-pyridine methanethiol as a meat flavor are numerous. For example, in meat analog systems the problem has been to supply a high protein product with a meaty, palatable flavor. Incorporation of 2-pyridine methanethiol in such an analog provides a product which is high in protein, inexpensive to prepare and has a natural meaty flavor.

2-pyridine methanethiol can be incorporated into any solid carrier to exhibit its pork-like flavor and aroma. It is therefore not limited to use in meat or meat analog systems but to any type of solid system where a meaty flavor is desired. For example, it can be incorporated into cheese spreads to give a "bacony" flavor to the dairy product, into dog biscuits as well as the dog meal itself and can also be incorporated into a crystal structure to act as a meat seasoning. The preferred embodiments of this invention however are meats and meat analog systems.

It is therefore, a principal object of this invention to provide a composition to be incorporated into meat and meat-like products, especially vegetable protein analogs which provide a roast pork flavor and which improves beef, pork and lamb flavor already present in the system.

DESCRIPTION OF THE INVENTION 2-pyridine methanethiol is useful for direct addition to meat or synthesized vegetable protein-based meat-like systems for improving the natural flavor present or, in the case of meat analogs and the like, for initially imparting a natural roast pork flavor.

2-pyridine methanethiol is inexpensive to prepare and is readily synthesized by the reaction set forth in the Journal of the American Chemical Society, 1949, vol. 71 p. 2270. Essentially, the compositions of this invention are formed by admixing with, adding to, or incorporating in a food the product obtained by reacting 2-pyridine carboxyaldehyde with ethanolic ammonium hydrosulfide.

For use as a meat flavoring agent, 2-pyridine methanethiol is highly purified in order to acquire the desired roast pork character, the degree of purification being not less than 90%, and is preferably fixed in a solid soluble carrier. A solid carrier as opposed to a liquid carrier is preferred due to the tendency of 2-pyridine methanethiol to polymerize in a liquid system. Where 2-pyridine methanethiol is employed directly in the foodstuff, it is preferred that 2-pyridine methanethiol be present at a concentration in the range of .01 to 2 p.p.m. by weight of the foodstuff.

A high degree of purification is necessary to achieve the required roast pork flavor and for its flavor-improving character to be released. This is most often done by careful fractional distillation after which the 2-pyridine methanethiol fraction is checked by gas chromatography against a pure sample of the same. It is not necessary for a gas chromatographic analysis to be performed initially in order to acquire the fraction, as long as the distillation process is carried out efficiently.

In order to fix 2-pyridine methanethiol within a carrier, the compound is most often emulsified in gum arabic and spray dried. However, for purposes of fixation it can also be homogenized with a gelatinized starch or dextrin and either spray dried or freeze dried, both methods rendering an adequate fixation of the compound. The principal behind this method of fixation is to encapsulate the 2-pyridine methanethiol in a water soluble substance which actually forms a film around the compound to protect its characteristic flavor and flavor improvement properties.

The invention is illustrated but not limited by the following specific examples.

EXAMPLE I 2-pyridine methanethiol is prepared as follows:

In a 1 liter 3-neck flask fitted with a sealed stirrer, a reflux condenser and a drying tube is placed 23.5 gms. (0.22 mole) of 2-pyridine carboxyaldehyde and 500 ml. of an ethanolic solution of ammonium hydrogen sulfide prepared as follows:

500 ml. of absolute ethanol is saturated with anhydrous ammonia at 15° C. The solution is divided into 2 equal portions and dry hydrogen sulfide is passed into one portion until crystallization begins, after which the 2 solutions are mixed and used immediately. The mixture is stirred at room temperature for 5 hrs., heated in a water bath for 1 hour and allowed to stand overnight. The volatiles are removed by distillation from the steam bath at reduced pressure, leaving a brown residue, the disulfide.

Without further purification, the disulfide is transferred to a 1 liter 3-neck flask fitted with a mechanical stirrer, reflux condenser and dropping funnel. 500 ml. of ether are added, together with aluminum amalgam prepared as follows:

30 gms. of aluminum turnings are freed from oil by washing with ether. They are stirred with a 5% mercuric chloride solution for a few minutes and washed quickly with water followed by methyl alcohol. The amalgamated aluminum is used at once.

The stirrer is started and 30 ml. of water is added to the suspension over a period of 10 minutes. The reduction commences almost immediately and the mixture is heated periodically in a warm water bath to maintain reflux. After standing overnight, the aluminum sludge is separated by filtration and washings combined, dried with calcium sulfate, filtered and the solvent stripped finally under reduced pressure.

The residue is fractionated at 87–89° C. (10 mm.) to give 9.07 gms. (33% yield) of 2-pyridine methanethiol.

EXAMPLE II

To fix 2-pyridine methanethiol, 1 gm. of this compound was mixed with 100 gms. of "Mor-Rex" having a dextrose equivalent (DE) of 10. 400 milliliter of water was added and the mixture was homogenized using a Waring blender. When the "Mor-Rex" and 2-pyridine methanethiol were completely in solution, the mixture was freeze-dried yielding a readily soluble crystalline solid form.

It was found that any water soluble or dispersible carbohydrate may be used as a carrier for the purpose of fixing the 2-pyridine methanethiol prior to freeze-drying, spray drying, or drum drying.

EXAMPLE III

The following flavor formulation for a synthetic hot dog was prepared:

| Dry phase: | Gms. |
|---|---|
| Meat base P732 (Kohnstamm) | 7.360 |
| Firmenick smoke 52.676 TRP | 1.840 |
| Dry mustard (Coleman) | 0.368 |
| Natural garlic powder IFF V17255 | 0.1472 |
| Ribotide (Takeda) | 0.368 |

| Liquid phase: | Ml. |
|---|---|
| Pork fat P2344 (1%) | 2.210 |
| Frankfurter spice P2279 (1%) | 11.040 |

A sufficient amount of both the liquid and dry phases was prepared to render a "batch" amounting to 1890 gms. A 10% alcoholic solution of 2-pyridine methanethiol was prepared and a sufficient amount added to the hot dog mixture to yield a concentration of 2 p.p.m. of 2-pyridine methanethiol. This was evaluated against a control consisting of identical amounts of the liquid and dry phases of the flavor mixture but was lacking the 2-pyridine methanethiol. The flavor composition containing the 2-pyridine methanethiol was judged to have a meatier, more pork-like flavor than the control and was generally evaluated as being superior to said control in flavor and palatability.

EXAMPLE IV

The following soy hot dog base was prepared:

| Meat base: | Gms. |
|---|---|
| Soy isolate | 951.1 |
| Wenger product | 498.0 |
| Water | 385.7 |
| Albumen | 27.5 |
| Red #3 | .388 |
| Yellow #6 | .724 |
| Crisco oil | 42.4 |
| Beef fat | 370.9 |

To 200 gms. of the above meat base mixture was added the following:

| | |
|---|---|
| IFF Frankfurter V28,544 gms. | 0.60 |
| IFF Salami V29,615 gms. | 0.80 |
| Firmenick smoke 51,676 TRP gms. | 0.08 |
| 2-methoxy, 4-methylphenol (0.1%) ml. | 0.8 |
| Salt gms. | 4.0 |

To 25 gms. of this formulation was added five (5 drops) of 2-pyridine methanethiol to give a total concentration of 0.28 p.p.m. 2-pyridine methanethiol. This composition was then autoclaved for 15 minutes at 10 p.s.i. and subsequently evaluated for flavor against an identical control without 2-pyridine methanethiol. 2-pyridine methanethiol was found to impart desirable meaty, pork-like notes that improved the overall hot dog flavor as compared to the control system.

Further tests were made with this compound at use levels ranging from 0.1 to 1.0 p.p.m. in the same hot dog base. Results of these tests confirmed that 2-pyridine methanethiol improves the meaty, pork-like quality of the soy hot dog base material.

EXAMPLE V

The following gravy base was prepared:

| | Gms. |
|---|---|
| Flour | 49 |
| Corn starch | 25 |
| Salt | 8 |
| Monosodium glutamate | 15 |
| Nitrate | 0.3 |

Thirty (30) gms. of this mixture is dispersed in 500 mls. warm water. Five grams (5 gms.) of Maggi HVP 4BE and 3 gms. IFF Beef flavor #V29,521 is added to the mixture. Heat for 10–20 minutes over a steam bath. Add 1 ml. allyl methyl sulfide (0.01%) and 0.6 ml. of 0.01% methyl mercaptan.

At a use level of .1 p.p.m. in this formulated gravy base, the 2-pyridine methanethiol contributed an excellent meaty, roast pork flavor and aroma, as compared to the bland control.

We claim:

1. An artificially flavored meat or meat analog comprising meat or meat analog and .01 to 2 p.p.m. of at least 90% pure 2-pyridine methanethiol.

2. The foodstuff of claim 1 wherein the foodstuff contains additional meat flavoring agents.

References Cited

UNITED STATES PATENTS 3,702,253    11/1972    Winter et al. _____ 99—140 R

JOSEPH M. GOLIAN, Primary Examiner